United States Patent [19]
Effmert et al.

[11] 3,926,609
[45] Dec. 16, 1975

[54] GRANULAR MgO-CONTAINING POTASSIUM SALT FERTILIZERS AND PROCESS FOR THEIR MANUFACTURE

[75] Inventors: Alexander Effmert, Hannover; Ulrich Neitzel, Heringen, both of Germany

[73] Assignee: Kali und Salz Aktiengesellschaft, Kassel, Germany

[22] Filed: Apr. 18, 1974

[21] Appl. No.: 462,088

[52] U.S. Cl. .................. 71/31; 71/63; 71/64 DC
[51] Int. Cl.² ................................... C05D 9/02
[58] Field of Search .... 71/31, 64 D, 64 DC, 64 DA, 71/63

[56] References Cited
UNITED STATES PATENTS

| | | | |
|---|---|---|---|
| 2,935,387 | 5/1960 | Phillips | 71/64 DC |
| 3,617,243 | 11/1971 | Neitzel | 71/63 |
| 3,630,713 | 12/1971 | Adams et al. | 71/64 DC |
| 3,794,478 | 2/1974 | Diyksen | 71/64 DC |

*Primary Examiner*—Charles N. Hart
*Attorney, Agent, or Firm*—Haseltine, Lake & Waters

[57] ABSTRACT

Fertilizers having high abrasion resistance and compression resistance are produced by mixing dry hot potassium chloride or sulfate or a mixture thereof, optionally in combination with kieserite, with hot moist langbeinite at a final mix temperature between 75° and 110°C. and a total moisture content of 3–10%, and cooling the mixture with agitation to below 60°C. The desired grain size material of about 1–4 mm is separated from the finer grain size material which is recycled to the mixing step along with any ground coarser grain material.

14 Claims, No Drawings

GRANULAR MgO-CONTAINING POTASSIUM SALT FERTILIZERS AND PROCESS FOR THEIR MANUFACTURE

BACKGROUND OF THE INVENTION

The present invention relates to the production of granulated MgO-containing fertilizers from potassium chloride and sulfate salts.

German Pat. No. 1,238,496 discloses a process for preventing the agglomeration of fertilizers which utilizes very finely ground kieserite as a dusting agent for the fertilizer granules.

German Pat. No. 1,272,939 proposes a process for the manufacture of abrasion-resistant granules of potassium fertilizer salts which are intimately mixed with a solid, finely ground kieserite and then granulated together with cold water at a moisture content of approximately 11–16%.

German Pat. No. 2,106,212 discloses a process for manufacturing anhydrous granules of leonite or schonite, wherein the mixture is brought to a moisture content of 5–20% through the use of calcined recycled material in the amount of 2–5:1. The mixed material is simultaneously dried, calcined and granulated in a rotary drum, wherein, in order to effect calcination, the withdrawn material must evidence a temperature of 250–350°C.

The agglomerating granulation, with Kieserite as the binding means, leads to the formation of a granulate with an insufficient abrasion resistance and a much too low compression resistance.

SUMMARY OF THE INVENTION

There has now been found a process for manufacturing granulated MgO-containing fertilizers from potassium chloride and sulfate salts which is characterized in that dry, hot technical potassium chloride and/or dry, hot technical potassium sulfate and, if necessary, dry, hot kieserite is mixed with hot, moist langbeinite, $K_2SO_4 \cdot 2 MgSO_4$, having a temperature between approximately 75°–100°C and a moisture content of approximately 15–25%, under the application of a total moisture to the material to be granulated, calculated with respect to the dry components, of between approximately 4–8% at a total temperature of the material mixture of between approximately 70°–100°C, and granulated under constant agitation; with the moist granulate then being cooled under agitation to below 60°C, so that the granulate is solidified due to decomposition of the langbeinite and hydration of its $MgSO_4$ component.

DESCRIPTION OF PREFERRED EMBODIMENTS

Furthermore, a process has been found which is characterized in that the synthetic langbeinite utilized is the intermediate product of the evaporation of the liquor from $K_2SO_4$ production after washing free from adhering $MgCl_2$ solution, and that there are utilized fine granular potassium salts having a grain size of approximately 80% under 0.25 mm; that kieserite is used from the flotative separation of anhydrite from washed kieserite with an MgO content of approximately 20%; that kieserite is used from the washings of the hot solvent residue having an MgO content of approximately 25–28%, and that langbeinite is used in a finely divided, reactive grain size under 0.1 mm obtained in the manufacturing process or by grinding.

Furthermore, a process has been found which is characterized in that the mixture of the materials prior to granulation has a temperature of 85°–95°C. and that the dry hot materials are first mixed together and then subsequently mixed with the hot, moist langbeinite, and that then hot water is used to provide the total moisture to the mixture to be granulated, and that during cooling of the granulate, excess water is removed by aeration.

Additionally, a process has been found which is characterized in that the granulation is effected by agglomeration to produce over 75% of granulate cooled to below 60°C. having a grain size of between 1–4 mm and up to 25% fine granulate, and that ground coarse granulate is recycled to the starting mixture and wherein the hot, moist total mixture is formed by pressing into sheets (shells) having a thickness of approximately 3–6 mm, which are then cooled to below 60°C., and ground into a granulate, the desired granulate of approximately 1–4 mm being separated, the coarse granulate being reground and then recycled with the fine material into the starting mixture.

Furthermore, there has been found a process which is characterized in that the cooling of the moist granulate to below 60°C. is effected by introduction of air, or indirectly by cooling with water under agitation.

Furthermore, a process has been found which is characterized in that the dry, hot starting material consists of a mixture of 50–85% technical potassium sulfate, 15–50% kieserite, and the total mixture of the material to be granulated consists of 5–50% of hot moist langbeinite.

The process according to the invention is illustrated by the following examples:

EXAMPLE 1

23.3 t technical potassium chloride (56% $K_2O$; sieve analysis: 15% over 0.25 mm, 70% between 0.25 and 0.1 mm and 15% below 0.1 mm), 4.7 t kieserite (having an $MgSO_4$ content of 65% and a grain size of 70% over 0.25 mm), as well as 5.3 t recycled material was premixed in a cooling mixer, and then brought to a temperature of 80°C.

The kieserite was obtained from the flotative preparation of the so-called "wash kieserite", a by-product of potassium salt recovery.

In a rotating forced mixer (manufactured by the firm Lödige), there was mixed 7.0 t moist hot langbeinite at 80°C. This was obtained by evaporation of liquor from $K_2SO_4$ production and has the following composition: 18% $K_2O$; 15.5% MgO and 20% water; grain size 100% under 0.1 mm. The total moisture of the material to be granulated, as calculated with respect to the dry components, amounted to 3.6%.

The moist hot mixture was then pressed on a rolling press into sheets (shells) and finally cooled within 20 minutes to below 60°C. The sheets (shells) were carefully ground and run through a sieve. There was obtained 35.0 t granulate and 5.3 t fine material, which was then recycled into the mixing process.

| Composition of the Granulate: | Sieve Analysis: | above 4 mm: | 3% |
|---|---|---|---|
| 40.9% K$_2$O | | 3-4 mm: | 42% |
| 6.0% MgO | | 2-3 mm: | 33% |
| 3.9% H$_2$O | | 1-2 mm: | 22% |
| | | below 1 mm: | 5% |

EXAMPLE 2

19.0 t technical potassium sulfate (50.2% K$_2$O; sieve analysis: 15% over 0.25 mm and 85% below 0.25 mm), 8.7 t kieserite (having an MgSO$_4$ content of 80.5% and a grain size of 50% above 0.25 mm), as well as 10.2 t recycled material were mixed in a rotating forced mixer (manufactured by the firm Lödige) with 9.5 t moist hot langbeinite and 0.8 t water (mixing temperature: 95°C.).

The kieserite was obtained from the washings of the hot solvent residue from potassium salt production. The langbeinite was obtained by evaporation of the liquor from K$_2$SO$_4$ production and had the following composition: 17.5% K$_2$O; 15.0% MgO and 22% water; grain size: 100% below 0.1 mm.

The total moisture of the material to be granulated, calculated with respect to the dry components, amounted to 6.4%.

The moist hot mixture was granulated on a roll drum and subsequently cooled within 15 minutes to below 60°C., whereupon solidification took place. The cooled material was run through a sieve, the residual coarse material ground, and then again run through the sieve, 38.0 t granulate were obtained and 10.2 t fine material recycled into the process.

| Composition of the granulate: | Sieve analysis: | above 4 mm: | 4% |
|---|---|---|---|
| 41.6% K$_2$O | | 3-4 mm: | 27% |
| 4.7% MgO | | 2-3 mm: | 29% |
| 8.0% H$_2$O | | 1-2 mm: | 34% |
| | | below 1 mm: | 6% |

The process of the invention affords, in the granulation of potassium chloride and sulfate salts, the advantage of a higher yield of usable grain (1 to 4 mm) due to the solidification as a result of the decomposition of the hot langbeinite and the formation of double salts containing water of crystallization. The granulates according to the process of the invention have an extremely high abrasion-resistance, which has heretofore not been attainable in the granulation of potassium salts. These products remain practically dust-free even during transport and handling, as for example, spreading with fertilizer spreaders. In the process according to the invention there is obviated the usual drying required in granulation, since the product after cooling is solid and dry due to the hydration of the binding water.

As the starting material for carrying out the process there may be utilized preferably dust separated in cy-

| Composition of the granulate: | Sieve analysis: | Above 4 mm: | 10% |
|---|---|---|---|
| 29.6% K$_2$O | | 3-4 mm: | 23% |
| 9.9% MgO | | 2-3 mm: | 40% |
| 7.5% H$_2$O | | 1-2 mm: | 21% |
| | | below 1 mm: | 6% |

EXAMPLE 3

22.5 t technical potassium chloride (with 55% K$_2$O; grain size: 15% above 0.25 mm, 70% between 0.25 and 0.1 mm and 15% below 0.1 mm) was mixed with 8.1 t technical potassium sulfate (including 48.5% K$_2$O; grain size 15% above 0.25 mm, 40% between 0.25 and 0.1 mm and 45% below 0.1 mm), with 13.5 t moist, hot langbeinite, with 6.8 t recycled material and 1.2 t water in a rotating forced mixer (manufactured by the firm Lödige), (at a mixing temperature of 95°C.).

The langbeinite had the composition: 18.0% K$_2$O, 15.5% MgO and 20% water; grain size: 100% below 0.1 mm.

The total moisture of the material to be granulated calculated with respect to the dry components, amounted to 8.1%.

The moist hot mixture was then granulated by agglomeration (as in Example 2), and then further processed in an air stream, whereby 0.3 t water was removed and the mixture was cooled to below 60°C.

The cooled material was sieved, the coarse material ground, again run through the sieve; 45.0 t good sized grain was obtained and 6.8 t undersize grain was recycled into the mixing process.

clones and electrofilters. The hot moist langbeinite required for carrying out the process according to the invention, forms in other processes as an intermediate product, as for example in the manufacture of K$_2$SO$_4$. The moist hot langbeinites which are formed in such processes may be utilized for carrying out the process according to the invention.

The granulate which is produced in accordance with the process of the invention exhibits a high abrasion-resistance, which may be determined according to the following method: the grain fraction of 2-2.5 mm is vibrated for a period of 5 minutes with 10 steel balls having a 10 mm diameter on the 0.5 mm sieve of a sieve machine (Lavib type). According to this method, an abrasion of below 1% was encountered for the granulate of Example 2.

The compressive resistance of the granulate grain, according to Example 2, is extremely high at 3.8 kg per grain. The compressive resistance is determined as follows: an individual grain of the utilizable grain fraction 2-2.5 mm is subjected to a load on a directly indicating scale which is increased slowly until fracture, and then the value recorded in grams per grain. The compressive resistance was obtained from the average of 20 individual determinations.

Other granulated MgO-containing fertilizers produced in accordance with the process of the invention similarly provided a high abrasion-resistance (low abrasion), and high compression resistance.

Percentages throughout are in parts by weight.

We claim:

1. A process for manufacturing granulated MgO-containing fertilizers based on potassium chloride or sulfate salts, and having a high abrasion resistance and high compression resistance comprising
   1. mixing dry, hot technical potassium chloride or sulfate or mixture thereof, recycled material with a hot, moist langbeinite having a temperature of between approximately 75° and 100°C. and a moisture content of approximately 15 to 25% with the addition of sufficient water, to adjust the total moisture content of the mixture to between approximately 3 to 10% based on the dry components, said mixing being effected at a temperature of the mixture between approximately 75° and 110°C. under constant agitation to form a moist granulate,
   2. cooling the moist granulate under agitation to below 60°C., whereby the granulate is solidified,
   3. removing the desired size granular material and
   4. recycling the finer size material into the mixing step.

2. A process according to claim 1, wherein the langbeinite is the intermediate product obtained by evaporation of the liquor from $K_2SO_4$ production after washing out adhering $MgCl_2$ solution.

3. A process according to claim 1, wherein the potassium salts have a grain size of approximately 80% below 0.25 mm.

4. A process according to claim 1, wherein the kieserite is obtained from the flotative separation of anhydrite from washed kieserite and has an MgO content of approximately 20%.

5. A process according to claim 1, wherein the kieserite is obtained from the washings of the hot solvent residue and has an MgO content of approximately 25 to 28%.

6. A process according to claim 1, wherein the langbeinite has a grain size of below 0.1 mm.

7. A process according to claim 1 wherein the final mixture of materials prior to granulation has a temperature of 85° to 95°C.

8. A process according to claim 1 wherein the dry, hot materials are first mixed together and then mixed subsequently with the hot, moist langbeinite.

9. A process according to claim 1 wherein hot water is added to adjust the total moisture content of the mixture before granulation occurs.

10. A process according to claim 1 wherein during cooling of the granulate excess water is removed by aeration.

11. A process according to claim 1 wherein granulation occurs by agglomeration to yield over 75% of granulate with a grain size of between 1 to 4 mm after cooling below 60°C., and wherein the finer granulate and ground coarser granulate is recycled into the mixing step.

12. A process according to claim 1 wherein the hot, moist total mixture is formed through pressing into sheets of approximately 3 to 6 mm thickness, the sheets are cooled to below 60°C., then ground into a granulate, the grains of approximately 1–4 mm being separated as the desired product, the coarser grains being reground and then recycled with the finer grains into the mixing step.

13. A process according to claim 1 wherein the cooling of the moist granulate to below 60°C. is effected through the introduction of air or indirectly through cooling with water with agitation.

14. A process according to claim 1 wherein the dry, hot starting materials comprise a mixture of 50 to 85% technical potassium sulfate, 15 to 50% kieserite and the total mixture of the material to be granulated consists of 5 to 50% hot, moist langbeinite.

* * * * *

UNITED STATES PATENT OFFICE
CERTIFICATE OF CORRECTION

Patent No. 3,926,609  Dated 12/16/75

Inventor(s) Alexander Effmert et al

It is certified that error appears in the above-identified patent and that said Letters Patent are hereby corrected as shown below:

Cover Sheet
Cancel line 5 of column 1 and substitute therefor Ulrich Neitzel, Heringen and Alexander Effmert, Hannover.

Signed and Sealed this

Twenty-third Day of November 1976

[SEAL]

Attest:

RUTH C. MASON
Attesting Officer

C. MARSHALL DANN
Commissioner of Patents and Trademarks